(12) United States Patent
Cheng et al.

(10) Patent No.: US 9,284,789 B2
(45) Date of Patent: Mar. 15, 2016

(54) METHODS FOR FORMING EARTH-BORING TOOLS HAVING CUTTING ELEMENTS MOUNTED IN CUTTING ELEMENT POCKETS AND TOOLS FORMED BY SUCH METHODS

(71) Applicant: Baker Hughes Incorporated, Houston, TX (US)

(72) Inventors: Xiaomin C. Cheng, Houston, TX (US); Eric C. Sullivan, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 339 days.

(21) Appl. No.: 13/840,391

(22) Filed: Mar. 15, 2013

(65) Prior Publication Data

US 2014/0246249 A1    Sep. 4, 2014

Related U.S. Application Data

(60) Provisional application No. 61/771,683, filed on Mar. 1, 2013.

(51) Int. Cl.
*E21B 10/46* (2006.01)
*E21B 10/55* (2006.01)

(52) U.S. Cl.
CPC ..................... *E21B 10/55* (2013.01)

(58) Field of Classification Search
CPC ................................ E21B 10/55; E21B 10/46
See application file for complete search history.

(56) References Cited

U.S. PATENT DOCUMENTS

| 4,460,053 | A | 7/1984 | Jurgens et al. |
| 6,131,677 | A | 10/2000 | Arfele et al. |
| 6,568,491 | B1 | 5/2003 | Matthews, III et al. |
| 6,601,475 | B2 | 8/2003 | Davies et al. |
| 8,833,635 | B1 * | 9/2014 | Peterson ........................ 228/103 |
| 2007/0056777 | A1 | 3/2007 | Overstreet |
| 2007/0157763 | A1 * | 7/2007 | Oldham ....................... 76/108.2 |
| 2009/0044663 | A1 | 2/2009 | Stevens et al. |
| 2012/0292117 | A1 * | 11/2012 | John et al. ..................... 175/428 |

OTHER PUBLICATIONS

International Search Report for International Application No. PCT/US2014/019422 dated Jun. 16, 2014, 5 pages.
International Written Opinion for International Application No. PCT/US2014/019422 dated Jun. 16, 2014, 8 pages.

* cited by examiner

*Primary Examiner* — Catherine Loikith
(74) *Attorney, Agent, or Firm* — TraskBritt (57) ABSTRACT

Methods of forming earth-boring tools include using a plasma spray device to gouge at least one recess through a hardfacing material and into a body. At least a portion of the recess may define a cutting element pocket in which a cutting element may be received and bonded. The recess formed using the plasma spray device optionally may be further machined to form the cutting element pocket. Earth-boring tools are fabricated using such methods.

20 Claims, 7 Drawing Sheets

METHODS FOR FORMING EARTH-BORING TOOLS HAVING CUTTING ELEMENTS MOUNTED IN CUTTING ELEMENT POCKETS AND TOOLS FORMED BY SUCH METHODS

CROSS-REFERENCE TO RELATED APPLICATION

This application claims the benefit of the filing date of the U.S. Provisional Patent Application No. 61/771,683, filed Mar. 1, 2013, the disclosure of which is hereby incorporated herein in its entirety by this reference.

TECHNICAL FIELD

Embodiments of the disclosure relate to methods of forming earth-boring tools having cutting elements secured in cutting elements pockets, and to earth-boring tools formed using such methods.

BACKGROUND

Earth-boring tools are used to form boreholes (e.g., wellbores) in subterranean formations. Such earth-boring tools include, for example, drill bits, reamers, mills, etc. For example, a fixed-cutter earth-boring rotary drill bit (often referred to as a "drag" bit) generally includes a plurality of cutting elements secured to a face of a bit body of the drill bit. A conventional fixed-cutter earth-boring rotary drill bit includes a bit body having generally radially projecting and longitudinally extending blades.

A plurality of cutting elements is positioned on each of the blades. Generally, the cutting elements have either a disk shape or, in some instances, a more elongated, substantially cylindrical shape. The cutting elements commonly comprise a "table" of superabrasive material, such as mutually bound particles of polycrystalline diamond, formed on a supporting substrate of a hard material, such as cemented tungsten carbide. Such cutting elements are often referred to as "polycrystalline diamond compact" (PDC) cutting elements or cutters. The plurality of PDC cutting elements may be fixed within cutting element pockets formed in rotationally leading surfaces of each of the blades. Conventionally, a bonding material such as an adhesive or, more typically, a braze alloy may be used to secure the cutting elements to the bit body.

During drilling operations, the drill bit is positioned at the bottom of a well borehole and rotated. The bit body of a fixed-cutter rotary drill bit may be formed from steel or a composite material, such as a cemented tungsten carbide material. During normal drilling operations, the bit body of the drill bit is exposed to a variety of harsh conditions that can wear the bit body. In order to provide the bit body with increased wear resistance, a hardfacing material is often applied to outer surfaces of the bit body. The hardfacing material may include hard particles of sintered or cast tungsten carbide cemented within a metal alloy binder material. The hardfacing material may be applied as a layer by heating the metal binder material to its liquid state and applying the hardfacing material, with the molten metal binder and the hard particles therein to the surface of the bit body, and allowing the molten metal binder to cool with the hard particles embedded therein. The high temperatures required to apply the hardfacing material to the bit body may cause damage to the diamond portion of PDC cutting elements. Therefore, the PDC cutting elements may be fixed in the cutting element pockets after the hardfacing material has been applied to the bit body.

The increased hardness and wear resistance of hardfacing material makes machining of the hardfacing difficult when using conventional machining techniques, such as drilling, grinding, or milling. As a result, cutting element pockets are generally formed in a bit body prior to applying hardfacing material to the bit body. After forming a cutting element pocket in a bit body, a temporary displacement member may be placed in the cutting element pocket while hardfacing is applied to the bit body in the vicinity of the cutting element pocket, so as to prevent the cutting element pocket from being filled with hardfacing material. After the application of the hardfacing material, the displacement member may be ground out or otherwise removed from the pocket. Thereafter, a cutting element may be secured within the cutting element pocket.

BRIEF SUMMARY

In some embodiments, the present disclosure includes methods of forming an earth-boring tool. In accordance with such methods, a hardfacing layer may be formed over at least one surface of a body, and a plasma spray device may be used to gouge at least one recess through the hardfacing layer and into the body using a plasma emitted by the plasma spray device. At least a portion of the recess may define a cutting element pocket. At least one cutting element may be secured to the body at least partially within the cutting element pocket.

In additional embodiments, the present disclosure includes methods of forming an earth-boring rotary drill bit in which an abrasive and wear-resistant particle-matrix composite material is deposited over an outer surface of a blade of a bit body, and at least one recess is gouged through the composite material and into the bit body using a plasma. At least one cutting element is secured to the bit body. The at least one cutting element is disposed at least partially within the recess extending through the composite material and into the bit body.

In yet further embodiments, the present disclosure includes methods of forming an earth-boring tool. A plasma is sprayed toward a body of an earth-boring tool having hardfacing thereon to partially form a cutting element pocket in the earth-boring tool. A machining process is used to complete formation of the cutting element pocket in the earth-boring tool. The completely formed cutting element pocket extends through at least a portion of the hardfacing and into the body of the earth-boring tool. At least one cutting element is positioned at least partially within the cutting element pocket, and the at least one cutting element is secured to the body of the earth-boring tool.

Additional embodiments of the disclosure include earth-boring tools formed using methods as described herein. For example, an earth-boring tool may include a hardfacing material on at least one surface of a body of the tool. The body may further include at least one cutting element pocket that is formed by gouging a recess through the hardfacing material and into the body of the earth-boring tool using plasma. At least one cutting element may be at least partially disposed within the at least one cutting element pocket and secured to the body of the earth-boring tool.

BRIEF DESCRIPTION OF THE DRAWINGS

While the specification concludes with claims particularly pointing out and distinctly claiming what are regarded as embodiments of the present invention, advantages of the embodiments may be more readily ascertained from the following description of certain example embodiments when read in conjunction with the accompanying drawings in which:

DETAILED DESCRIPTION

The illustrations presented herein are not actual views of any particular earth-boring tool or component thereof, but are merely idealized representations that are employed to describe embodiments of the present disclosure. Additionally, elements common between figures may retain the same numerical designation.

Figure 1:
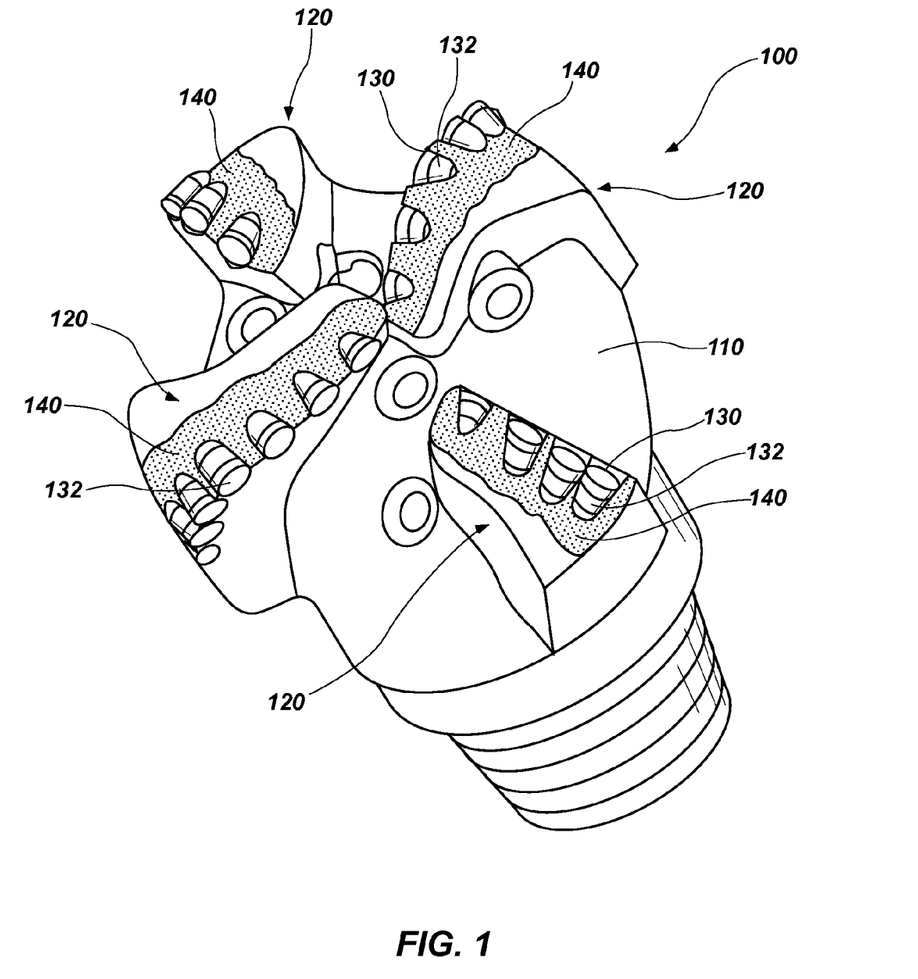
FIG. 1 illustrates a fixed-cutter earth-boring rotary drill bit.

FIG. 1 is a perspective view of an earth-boring tool in the form of a fixed-cutter rotary drill bit 100 having a bit body 110. Bit body 110 may have a plurality of radially projecting and longitudinally extending blades 120. In some embodiments, the bit body 110 may be at least substantially comprised of a metal alloy, such as a steel alloy. In some embodiments, the metal alloy (e.g., steel alloy) may be heat-treated to increase, for example, one or more of a hardness, a wear resistance, and a toughness of the bit body 110.

Each of the blades 120 may include a plurality of cutting element pockets 130 having cutting elements 132 secured therein. Cutting elements 132 may comprise, for example, PDC cutting elements. The cutting elements 132 and cutting element pockets 130 may be located, for example, at or near rotationally leading surfaces of the blades 120. Cutting elements 132 may be secured within cutting element pockets 130 using, for example, a bonding material such as a braze alloy. A hardfacing material 140 may be disposed on outer surfaces of the blades 120 of the bit body 110 adjacent or proximate the cutting elements 132 and the cutting element pockets 130. As disclosed in further detail below, in accordance with embodiments of the present disclosure, formation of the drill bit 100 may include depositing or otherwise providing the hardfacing material 140 over the surface of the bit body 110, gouging a recess through the hardfacing material 140 and into the bit body 110 using a plasma spray device, machining the recess as needed to form a cutting element pocket 130 therefrom, and then securing at least one cutting element 132 to the bit body 110 at least partially within the cutting element pocket 130.

Figure 2:
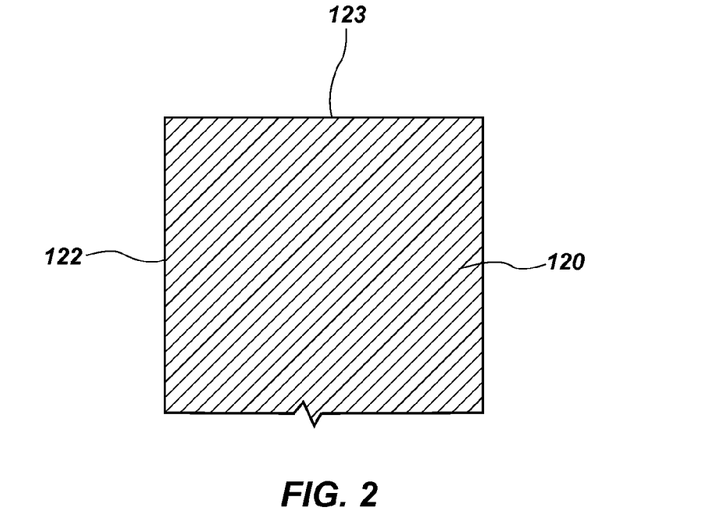
FIG. 2 illustrates a cross-sectional view of a portion of a blade of an earth-boring tool prior to application of a hardfacing thereto.

FIG. 2 is a partial cross-sectional view of a portion of one blade 120 of the bit body 110 of the drill bit 100 prior to application of hardfacing material 140 (FIG. 1) to an outer surface 123 of the blade 120. As previously mentioned, in some embodiments the material of the bit body 110, including the blades 120, may have been heat treated at this point so as to improve one or more properties or characteristics of the material of which the bit body 110 is formed.

Figure 3:
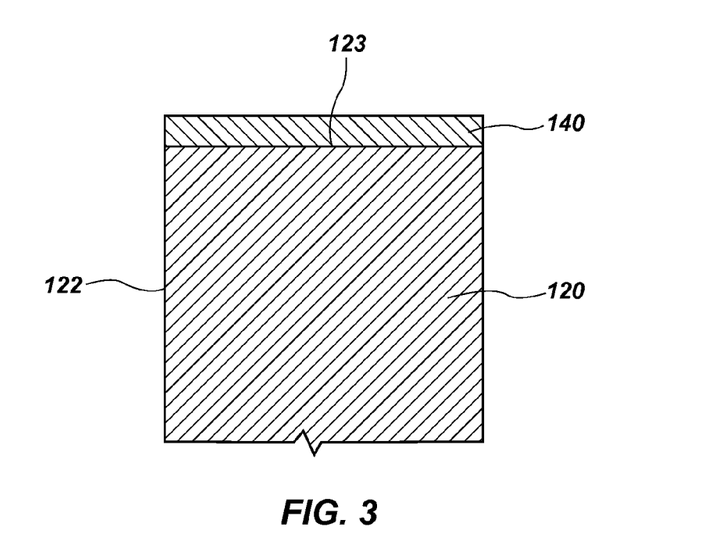
FIG. 3 illustrates a layer of hardfacing applied to an outer surface of the blade of FIG. 2.

Referring to FIG. 3, a layer of hardfacing material 140 may be deposited or otherwise formed over one or more surfaces of the blade 120, such as an outer formation-engaging surface 123 of the blade 120. The layer of hardfacing material 140 may be applied prior to forming any cutting element pockets 130 (FIG. 1) in the blade 120, and may extend over the outer surface 123 to a rotationally leading surface 122 of the blade 120. For simplicity, the hardfacing material 140 is shown as covering only a single surface of the blade 120. The hardfacing material 140 may extend entirely or partially over any one or more surfaces of the blade 120 of the bit body 110, although the hardfacing material 140 may be applied at least partially over an area on the blade 120 in which a cutting element pocket 130 is to be subsequently formed, as described below.

The hardfacing material 140 may be formed by, for example, depositing an abrasive and wear-resistant particle-matrix composite material over one or more surfaces of the blade 120. Different types of hardfacing materials are known in the art and any suitable hardfacing material may be used. As a non-limiting example, the hardfacing material 140 may be selected to include a material such as cemented tungsten carbide, having an iron-based alloy, nickel-based alloy, or cobalt-based alloy binder of 5% to 25% by weight in which hard particles, such as tungsten carbide, are embedded. In some embodiments, the hardfacing material 140 may be applied to the surface of the blade 120 or the surface of the bit body 110 using processes that result in a metallurgical bond between the hardfacing material 140 and the blade 120 or bit body 110, such as plasma-arc welding, plasma-transferred-arc welding, furnace fusing, pressure-assisted sintering, and reaction bonding. In other embodiments, the hardfacing material 140 may be applied to the surface of the blade 120 or bit body 110 using processes that do not result in such a metallurgical bond, such as high velocity oxy-fuel (HVOF) spraying, high velocity air fuel (HVAF) spraying, flame spraying, and non-transferred arc plasma spraying. In yet further embodiments, the hardfacing material 140 may be applied using a method resulting in a braze joint, such as furnace brazing, etc. Thus, in some embodiments, the hardfacing material 140 may be metallurgically bonded to the one or more surfaces of the blade 120. Moreover, the hardfacing material 140 may be applied as a layer extending over the blade 120 having a substantially uniform layer thickness.

Figure 4:
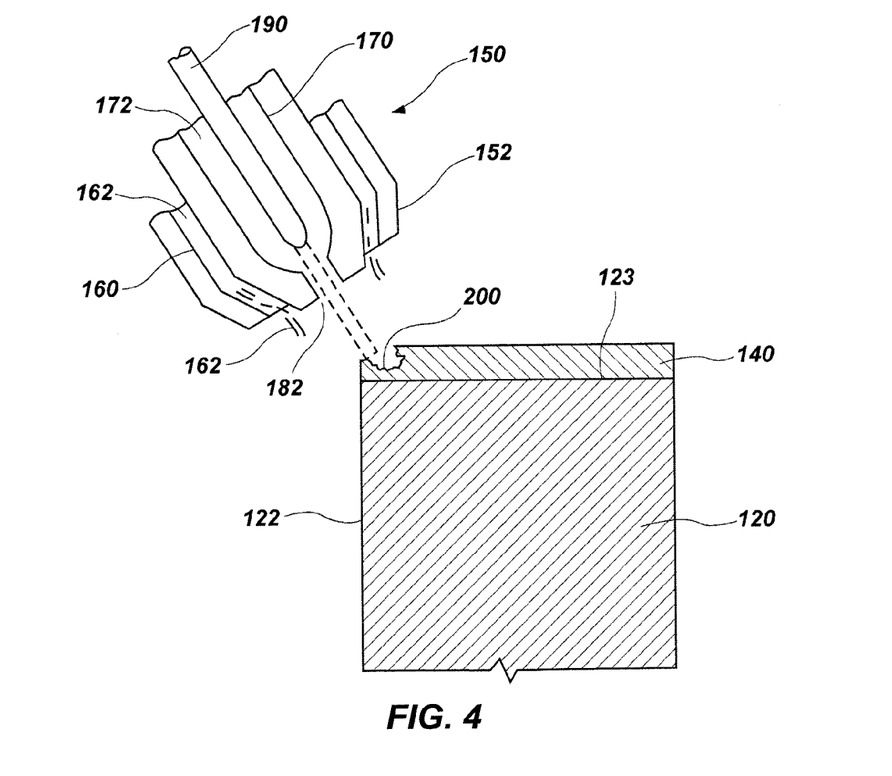
FIG. 4 illustrates a plasma spray device gouging a recess extending through the hardfacing and into the body of the blade of FIG. 3.

Referring to FIG. 4, a plasma spray device 150 may be used to gouge at least one recess 200 through the layer of hardfacing material 140 and into the blade 120 of the bit body 110 using a plasma emitted by the plasma spray device 150. The plasma spray device 150 may comprise what is referred to in the art as a plasma-arc gouging (PAG) device, or a thermal gouging (TG) device. As described further below, at least a portion of the recess 200 formed by the plasma spray device 150 will at least partially define a cutting element pocket 130 (FIG. 1). Such commercial spray devices 150 are commercially available. For example, the plasma spray device 150 may include an outer body 152, a gas line 160 through which a shielding gas 162 may pass, a chamber 170 through which a plasma gas 172 may pass, a nozzle 182, and an electrode 190.

The plasma spray device 150 may be used to generate a constricted jet of high-temperature plasma gas that is used to melt and remove portions of the hardfacing 140 and the bit body 110. The plasma spray device 150 represented in FIG. 4 is provided merely as an example art and should not be construed as limiting the methods of the present disclosure. Other types of devices configured to generate a plasma that may be used to thermally gouge a recess 200 through the hardfacing 140 and into the blade 120 may be employed in embodiments of the disclosure.

During operation of the plasma spray device 150, a positive charge may be induced in the hardfacing material 140 and in the blade 120. The electrode 190 may be negatively charged using an external power supply, such as a direct-current electrode-negative system with open-circuit voltage. As the plasma gas 172 enters the chamber 170, the plasma gas 172 may move in a swirling flow pattern around the electrode 190. The flowing plasma gas reaches the nozzle 182 and is constricted therein. A plasma arc may form between the negatively charged electrode 190 and the positively charged hardfacing material 140 and blade 120, and the plasma arc may be used to generate and/or maintain a plasma from the flowing plasma gas. The plasma jet projected out from the nozzle 182 gouges away the hardfacing material 140 and the material of the blade 120 to form the recess 200. A shielding gas 162 may travel through gas lines 160 in the outer body 152 around the plasma jet. Shielding gas 162 acts to channel the flow of the plasma jet and to protect the surrounding surfaces of the drill bit 100 (FIG. 1) from oxidation or possible spatter of gouged material.

The plasma spray device 150 may be oriented such that the plasma jet is generally oriented along a plane in which the longitudinal axis of the cutting element pocket 130 to be formed is disposed. The plasma spray device 150 may be further oriented such that the plasma jet impinges on the blade 120 from a side thereof adjacent (but vertically above) the rotationally leading surface 122 of the blade 120. The plasma spray device 150 may be inclined at an angle between, for example, 10 degrees and 60 degrees to a plane tangent to the outer surface 123 of the blade 120. A steeper angle may result in a deeper gouge in the hardfacing material 140 and/or the blade 120. A smaller angle may result in a more shallow gouge, and may remove less material from the hardfacing material 140 and/or the blade 120.

The plasma spray device 150 utilizes plasma gas 172 from which the plasma jet is generated. The plasma gas 172 may be conducted through the plasma spray device 150 via chamber 170. Plasma gas 172 may comprise gases such as nitrogen, oxygen, argon, hydrogen, etc., or a mixture of such gases. The shielding gas 162 my be conducted through the plasma spray device 150 via gas lines 160. The shielding gas 162 may comprise, for example, an inert gas.

Figure 5:
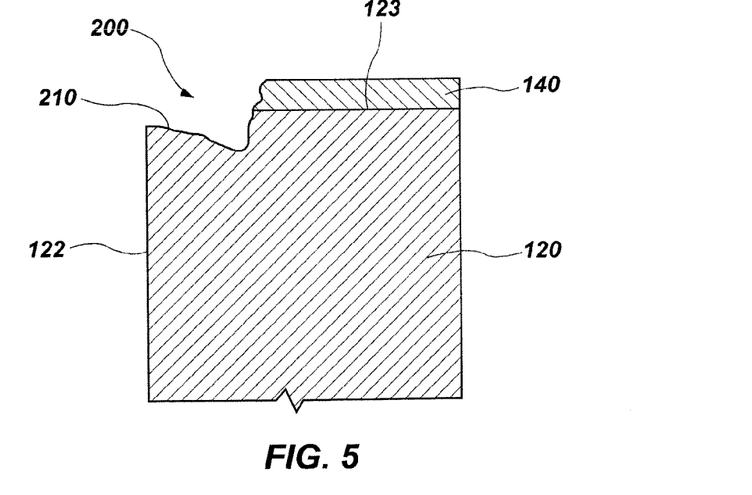
FIG. 5 illustrates a rough recess formed through the hardfacing and into the blade using the plasma spray device as shown in FIG. 4.

FIG. 5 illustrates a rough recess 200 formed using the plasma spray device 150 as illustrated in FIG. 4. The rough recess 200 extends through the hardfacing material 140 and into the blade 120. An interior surface 210 of the recess 200 has a rough and unfinished contour not suitable for receiving and bonding a cutting element 132 therein. Thus, the recess 200 is generally smaller than the final dimensions of the cutting element pocket 130 to be formed. In order to form the cutting element pocket 130 using the recess 200, the recess 200 may be further machined to remove additional material from the interior surface 210 of the recess 200 after using the plasma spray device 150 to form the rough, gouged recess 200.

Figure 6:
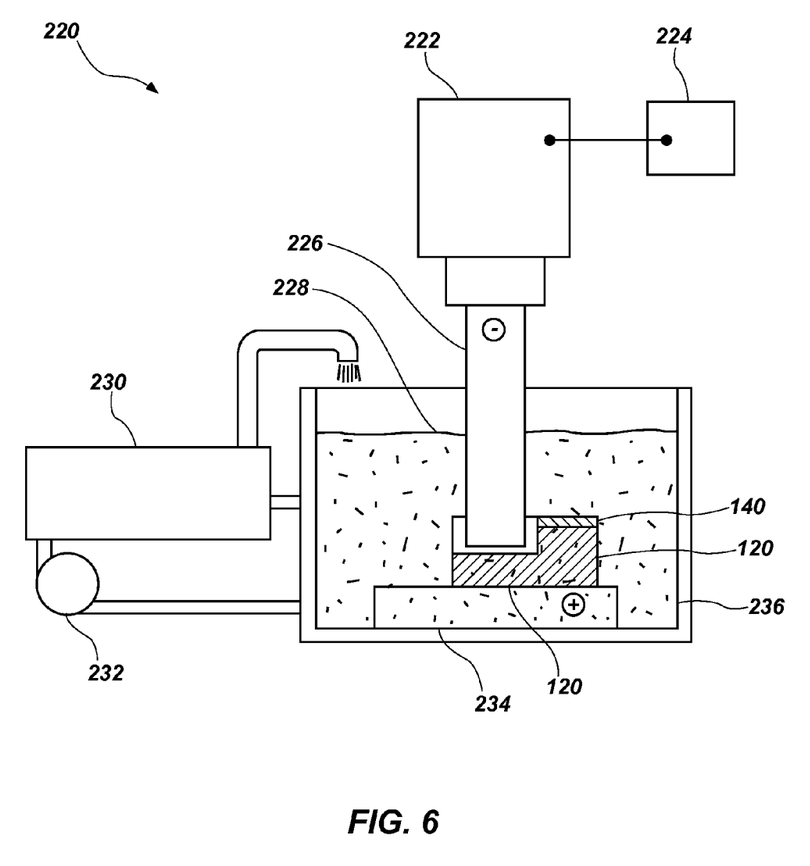
FIG. 6 illustrates an electrical discharge machining device removing additional material from the recess of FIG. 5 to form a cutting element pocket for receiving a cutting element therein.

Referring to FIG. 6, as a non-limiting example, an interior surface 210 of at least one recess 200 (FIG. 5) may be machined using an electrical discharge machining (EDM) process (e.g., an orbital EDM process) to machine the interior surface 210 of the at least one recess 200 by removing material from the interior surface 210. In further embodiments, conventional mechanical machining processes may be used to machine the interior surface 210 of the at least one recess 200. Such mechanical machining processes may comprise one or more of grinding, milling, and drilling the interior surface 210.

FIG. 6 illustrates an orbital EDM device 220 machining the interior surface 210 of the recess 200 (FIG. 5). Many such EDM devices 220 are commercially available and may be employed in embodiments of the present disclosure. As a non-limiting example, the orbital EDM device 220 may comprise an external power supply, a tank 236 containing a positively charged fixture 234 to hold and support a workpiece, such as, for example, blade 120 having hardfacing material 140 thereon. The tank 236 may also be filled with dielectric fluid 228. The dielectric fluid 228 may be deposited into tank 236 by pump 232 after traveling through filter 230.

Orbital EDM device 220 may further comprise a tool feed unit 222 connected to an electrode 226. The tool feed unit 222 may be controlled by a control unit 224, which is used to control the gap distance between the electrode 226 and the surface of the hardfacing material 140 and/or the blade 120.

Control unit 224 may also control the orbital movement of the electrode 226 across surfaces of the hardfacing material 140 and/or the blade 120. Orbital EDM device 220 may facilitate the movement of the electrode 226 along a controlled, orbital or cyclic path over the surface of the hardfacing material 140 and/or the blade 120 being machined. Orbital movement of the electrode 226 may enhance the removal of debris from the gap between the electrode 226 and the surface being machined during operation. Additionally, orbital movement of the electrode 226 may help to provide an improved surface finish to the machined surfaces of the blade 120 and the hardfacing material 140.

During operation, material is removed from the hardfacing material 140 and/or the blade 120 by a constant stream of electrical discharges across a gap formed between the electrode 226 and the hardfacing material 140 and/or the blade 120. The constant stream of discharges across the gap melts, vaporizes, and/or erodes surfaces to the desired shape. This process is facilitated by the presence of dielectric fluid 228, which acts to insulate any discharge up to the point that the dielectric fluid ionizes due to a voltage applied across a gap between the electrode 226 and the hardfacing material 140 and/or the blade 120. The discharge then flows to the hardfacing material 140 and/or the blade 120, removing material therefrom.

Dielectric fluid 228 may also facilitate the removal of debris and machined particles from the surface of hardfacing material 140 and/or the blade 120 and maintenance of an unobstructed gap between the electrode 226 and the surfaces being machined. The dielectric fluid 228 may comprise one or more of a petroleum-based dielectric fluid, glycol, water, silicone fluid, kerosene, and mixtures of such fluids.

Figure 7:
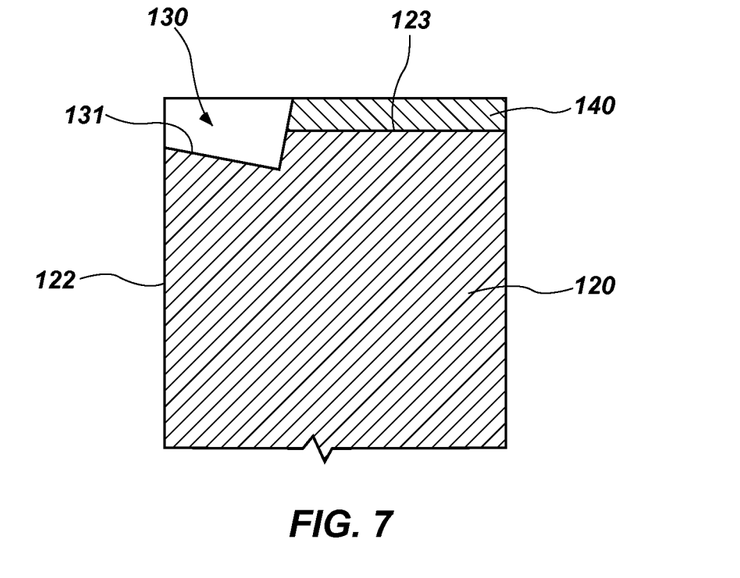
FIG. 7 illustrates a cutting element pocket formed through the hardfacing and in the blade using the electrical discharge machining device as shown in FIG. 6.
Figure 8:
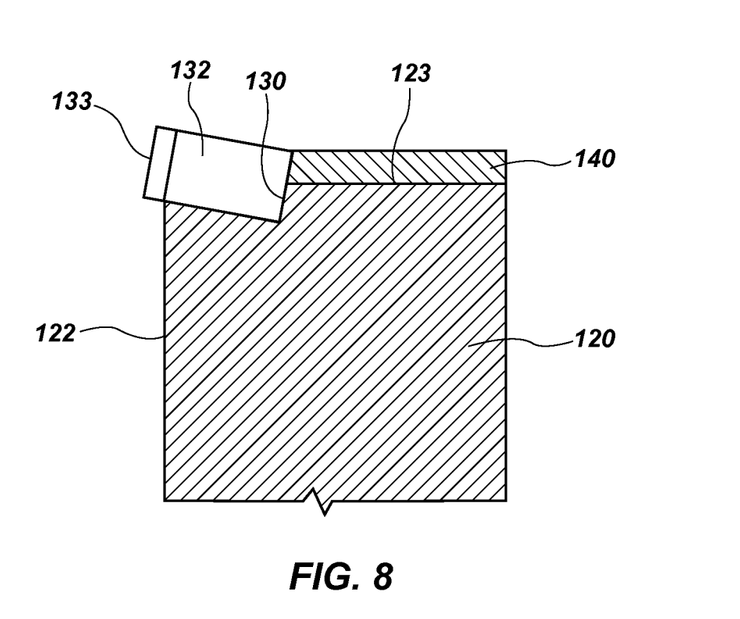
FIG. 8 illustrates a cutting element secured to the blade within the cutting element pocket shown in FIG. 7.

FIG. 7 is a partial cross-sectional view of the blade 120 having a hardfacing material 140 thereon, after the EDM device 220 has been used to further machine the recess 200 (FIG. 6) to form a cutting element pocket 130. The cutting element pocket 130 has an interior surface 131 having dimensions and a surface finish suitable for receiving and bonding a cutting element 132 herein, as shown in FIG. 8. The interior surface 131 of the cutting element pocket 132 may have a generally cylindrical lateral sidewall, which may be complementary to an exterior lateral side surface of the cutting element 132 to be received and bonded in the cutting element pocket 130.

In some embodiments, the cutting element 132 may have a generally cylindrical lateral sidewall surface extending between two substantially planar end surfaces. Such configurations are commonly used for PDC cutters. Cutting element 132 may be secured within the cutting element pocket 130 such that a front cutting face 133 of the cutting element 132 is oriented in the intended direction of tool rotation during use. The cutting element 132 may include a rear face that abuts against at least a portion of an interior surface of the cutting element pocket 130. As shown in FIG. 8, the hardfacing material 140 may extend over the outer surface 123 of the blade 120 to the cutting element 132. Cutting element 132 may be secured within the cutting element pocket 130 using a brazing alloy, a soldering alloy, or an adhesive material disposed between the cutting element 132 and the surfaces of the blade 120 and hardfacing material 140 that define the cutting element pocket 130.

Referring again to FIG. 4, in additional embodiments, the plasma spray device 150 may be oriented at angles other than the orientation illustrated in FIG. 4. The plasma spray device 150 may oriented such that a recess 200 is formed that is shallower or deeper than the recess 200 illustrated in FIG. 5. The plasma spray device 150 may be oriented such that the plasma spray device 150 begins to gouge the recess 200 in the hardfacing material 140 and the blade 120 in a different location than is shown in FIG. 4. For example, plasma spray device 150 may be positioned vertically over the blade 120 or behind the blade 120, and may be oriented such that the plasma jet extends generally toward the rotationally leading surface 122 of the blade 120 when gouging the recess 200 through the hardfacing material 140 and into the blade 120.

The EDM device 220 may similarly be used at different locations and orientations than is shown in FIG. 6.

Figure 9:
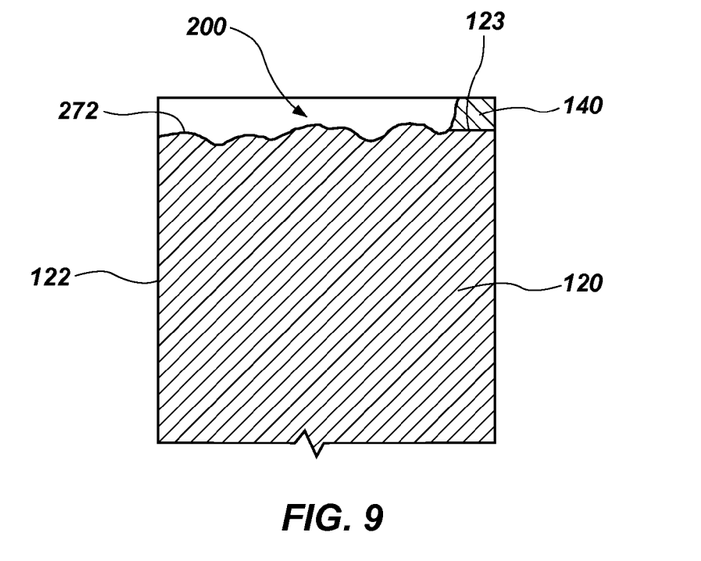
FIG. 9 is a cross-sectional view like that of FIG. 5 illustrating another rough recess formed through a hardfacing layer and into a blade in accordance with another embodiment of the disclosure.
Figure 10:
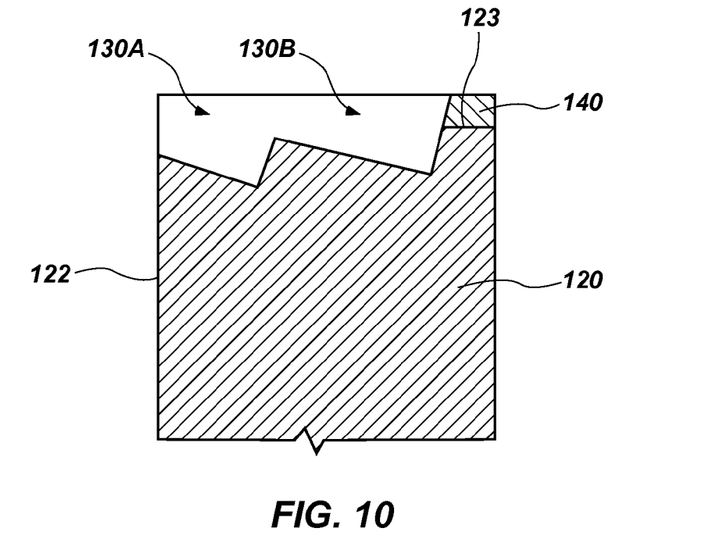
FIG. 10 is a cross-sectional view like that of FIG. 7 illustrating two cutting element pockets formed into the blade of FIG. 9 by further machining the rough recess formed through the hardfacing layer and into the blade.
Figure 11:
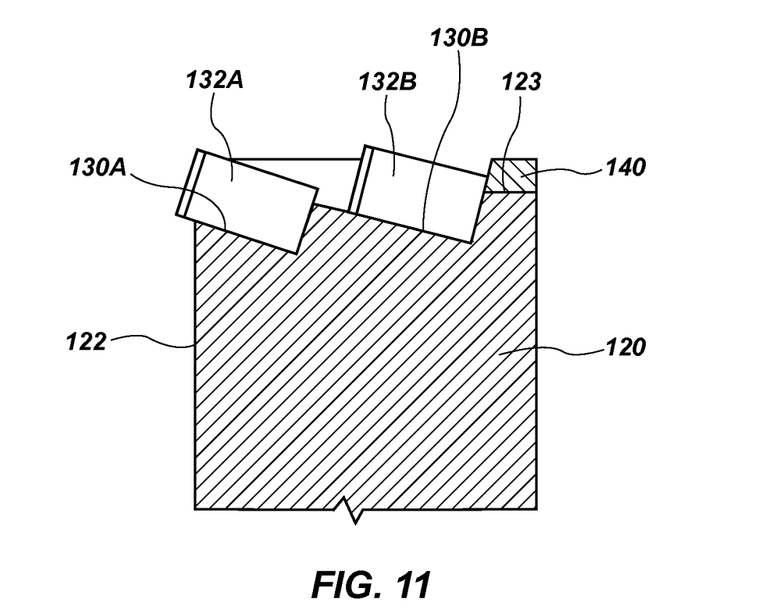
FIG. 11 illustrates two cutting elements secured in the two cutting element pockets of FIG. 10.

FIGS. 9 through 11 illustrate an additional embodiment in which one recess 200 is formed using a plasma spray device, after which different portions of the recess 200 are used to form two or more different cutting element pockets.

Referring to FIG. 9, a recess 200 may be formed using methods similar to those previously described to gouge the recess 200 through hardfacing material 140 and into the blade 120 using a plasma spray device 150. The recess 200 is shown to span a greater width of blade 120 compared to the recess 200 shown in FIG. 5. As shown in FIG. 10, a machining process then may be used to machine a first cutting element pocket 130A and a second cutting element pocket 130B through the hardfacing 140 and into the blade 120. For example, an EDM device 220 may be employed to form the cutting element pockets 130A, 130B by machining interior surfaces 272 within the rough recess 200 as previously described in relation to FIG. 6.

In some embodiments, the cutting element pocket 130B may be positioned rotationally behind the cutting element pocket 130A, as shown in FIG. 10.

As shown in FIG. 11, a first primary cutting element 132A may be disposed and secured within the first cutting element pocket 130A, and a second backup cutting element 132B may be disposed and secured within the second cutting element pocket 130B using methods as previously described with reference to FIG. 8.

Additional non-limiting example embodiments of the disclosure are set forth below.

Embodiment 1: A method of forming an earth-boring tool, the method comprising: forming a hardfacing layer over at least one surface of a body; using a plasma spray device to gouge at least one recess through the hardfacing layer and into the body using a plasma emitted by the plasma spray device, at least a portion of the at least one recess defining a cutting element pocket; and securing at least one cutting element to the body at least partially within the cutting element pocket.

Embodiment 2: The method of Embodiment 1, further comprising selecting the hardfacing layer to comprise a cemented tungsten carbide material.

Embodiment 3: The method of Embodiment 1 or Embodiment 2, further comprising selecting the body to comprise a bit body of an earth-boring rotary drill bit.

Embodiment 4: The method of any one of Embodiments 1 through 3, further comprising: selecting the body to comprise a plurality of blades; depositing the hardfacing layer over an outer surface of at least one blade of the plurality of blades; and forming the at least one recess in the at least one blade of the plurality of blades.

Embodiment 5: The method of any one of Embodiments 1 through 4, further comprising machining an interior surface of the at least one recess after using the plasma spray device to gouge the at least one recess through the hardfacing layer and into the body.

Embodiment 6: The method of Embodiment 5, wherein machining the interior surface of the at least one recess comprises using an electrical discharge machining process to remove material from the interior surface of the at least one recess.

Embodiment 7: The method of Embodiment 5 or Embodiment 6, wherein machining the interior surface of the at least one recess comprises at least one of grinding, milling, and drilling the interior surface of the at least one recess.

Embodiment 8: A method of forming an earth-boring rotary drill bit, the method comprising: depositing an abrasive and wear-resistant particle-matrix composite material over an outer surface of a blade of a bit body; gouging at least one recess extending through the composite material and into the bit body using a plasma; and securing at least one cutting element to the bit body, the cutting element disposed at least partially within the at least one recess extending through the composite material and into the bit body.

Embodiment 9: The method of Embodiment 8, further comprising machining an interior surface of the at least one recess.

Embodiment 10: The method of Embodiment 9, wherein machining the interior surface of the at least one recess comprises using an electrical discharge machining process to machine the interior surface of the at least one recess.

Embodiment 11: The method of Embodiment 9 or Embodiment 10, wherein machining the interior surface of the at least one recess comprises mechanically machining the interior surface of the at least one recess.

Embodiment 12: A method of forming an earth-boring tool, the method comprising: spraying plasma toward a body of an earth-boring tool having hardfacing thereon to partially form a cutting element pocket in the earth-boring tool; using a machining process to complete formation of the cutting element pocket in the earth-boring tool, the completely formed cutting element pocket extending through at least a portion of the hardfacing and into the body of the earth-boring tool; and positioning at least one cutting element at least partially within the cutting element pocket; and securing the at least one cutting element to the body of the earth-boring tool.

Embodiment 13: The method of Embodiment 12, further comprising selecting the hardfacing to comprise a cemented tungsten carbide material.

Embodiment 14: The method of Embodiment 12 or Embodiment 13, further comprising selecting the body to comprise a bit body of an earth-boring rotary drill bit.

Embodiment 15: The method of Embodiment 14, further comprising selecting the body to comprise heat-treated steel.

Embodiment 16: The method of any one of Embodiments 12 through 15, further comprising: selecting the body to comprise a plurality of blades; depositing the hardfacing over an outer surface of at least one blade of the plurality of blades; and forming the cutting element pocket in the at least one blade of the plurality of blades.

Embodiment 17: The method of any one of Embodiments 12 through 16, further comprising machining an interior surface of the cutting element pocket after spraying the plasma toward the body of the earth-boring tool having hardfacing thereon to partially form the cutting element pocket.

Embodiment 18: The method of Embodiment 17, wherein machining the interior surface of the cutting element pocket comprises using an electrical discharge machining process to remove material from the interior surface of the cutting element pocket.

Embodiment 19: The method of Embodiment 17 or Embodiment 18, wherein machining the interior surface of the cutting element pocket comprises mechanically machining the interior surface of the cutting element pocket.

Embodiment 20: An earth-boring tool formed in accordance with a method as recited in any one of Embodiments 1 through 19.

Embodiment 21: An earth-boring tool, comprising: a hardfacing material on at least one surface of a body of the earth-boring tool; at least one cutting element pocket at least partially formed by gouging a recess through the hardfacing material and into the body of the earth-boring tool using plasma; and at least one cutting element at least partially disposed within the at least one cutting element pocket and secured to the body of the earth-boring tool.

Although the foregoing description contains many specifics, these are not to be construed as limiting the scope of the present invention, but merely as providing certain embodiments. Similarly, other embodiments of the disclosure may be devised that do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A method of forming an earth-boring tool, the method comprising:
    forming a hardfacing layer over at least one surface of a body;
    using a plasma spray device to gouge at least one recess through the hardfacing layer and into the body using a plasma emitted by the plasma spray device, at least a portion of the at least one recess defining a cutting element pocket;
    machining an interior surface of the at least one recess after using the plasma spray device to gouge the at least one recess; and
    securing at least one cutting element to the body at least partially within the cutting element pocket.

2. The method of claim 1, further comprising selecting the hardfacing layer to comprise a cemented tungsten carbide material.

3. The method of claim 1, further comprising selecting the body to comprise a bit body of an earth-boring rotary drill bit.

4. The method of claim 1, further comprising:
    selecting the body to comprise a plurality of blades;
    depositing the hardfacing layer over an outer surface of at least one blade of the plurality of blades; and
    forming the at least one recess in the at least one blade of the plurality of blades.

5. The method of claim 1, wherein machining the interior surface of the at least one recess comprises using an electrical discharge machining process to remove material from the interior surface of the at least one recess.

6. The method of claim 1, wherein machining the interior surface of the at least one recess comprises at least one of grinding, milling, or drilling the interior surface of the at least one recess.

7. A method of forming an earth-boring rotary drill bit, the method comprising:
    depositing an abrasive and wear-resistant particle-matrix composite material over an outer surface of a blade of a bit body;
    gouging at least one recess extending through the composite material and into the bit body using a plasma;
    machining an interior surface of the at least one recess after using the plasma to gouge the at least one recess; and
    securing at least one cutting element to the bit body, the at least one cutting element disposed at least partially within the at least one recess extending through the composite material and into the bit body.

8. The method of claim 7, wherein machining the interior surface of the at least one recess comprises using an electrical discharge machining process to machine the interior surface of the at least one recess.

9. The method of claim 8, wherein machining the interior surface of the at least one recess comprises mechanically machining the interior surface of the at least one recess.

10. A method of forming an earth-boring tool, the method comprising:
    spraying plasma toward a body of an earth-boring tool having hardfacing thereon to partially form a cutting element pocket in the earth-boring tool;
    using a machining process to complete formation of the cutting element pocket in the earth-boring tool, the completely formed cutting element pocket extending through at least a portion of the hardfacing and into the body of the earth-boring tool;
    machining an interior surface of the cutting element pocket after spraying the plasma toward the body of the earth-boring tool;
    positioning at least one cutting element at least partially within the cutting element pocket; and
    securing the at least one cutting element to the body of the earth-boring tool.

11. The method of claim 10, further comprising selecting the hardfacing to comprise a cemented tungsten carbide material.

12. The method of claim 10, further comprising selecting the body to comprise a bit body of an earth-boring rotary drill bit.

13. The method of claim 12, further comprising selecting the body to comprise heat-treated steel.

14. The method of claim 10, further comprising:
selecting the body to comprise a plurality of blades;
depositing the hardfacing over an outer surface of at least one blade of the plurality of blades; and
forming the cutting element pocket in the at least one blade of the plurality of blades.

15. The method of claim 10, wherein machining the interior surface of the cutting element pocket comprises using an electrical discharge machining process to remove material from the interior surface of the cutting element pocket.

16. The method of claim 10, wherein machining the interior surface of the cutting element pocket comprises mechanically machining the interior surface of the rutting element pocket.

17. An earth-boring tool, comprising:
a hardfacing material on at least one surface of a body of the earth-boring tool;
at least one cutting element pocket at least partially formed by gouging a recess through the hardfacing material and into the body of the earth-boring tool using plasma;
an interior surface of the at least one cutting element pocket formed by machining the at least one cutting element pocket after using the plasma to gouge the recess; and
at least one cutting element at least partially disposed within the at least one cutting element pocket and secured to the body of the earth-boring tool.

18. The earth-boring tool of claim 17, wherein the at least one cutting element pocket further comprises a plurality of cutting element pockets located within a single recess.

19. The earth-boring tool of claim 18, wherein the at least one cutting element pocket and another cutting element pocket are located within the single recess, the another cutting element pocket positioned rotationally behind the at least one cutting element pocket.

20. The earth-boring tool of claim 19, wherein the at least one cutting element is disposed within the at least one cutting element pocket and another cutting element is disposed within the another cutting element pocket.

\* \* \* \* \*